United States Patent
McKague, Jr. et al.

(10) Patent No.: US 6,553,734 B1
(45) Date of Patent: Apr. 29, 2003

(54) COMPOSITE STRUCTURAL PANEL WITH UNDULATED BODY

(75) Inventors: Elbert Lee McKague, Jr., Fort Worth, TX (US); David T Uhl, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 21 days.

(21) Appl. No.: 09/645,728

(22) Filed: Aug. 24, 2000

(51) Int. Cl.$^7$ ................................................. B32B 27/00
(52) U.S. Cl. .................. 52/309.1; 52/309.7; 52/309.15; 52/630; 428/297.4; 428/298.4
(58) Field of Search ............................. 52/309.1, 309.7, 52/309.15, 309.16, 630, DIG. 7, 588.1; 428/304.4, 309.9, 315.9, 327, 298.4, 297.4, 295.7, 295.1

(56) References Cited

U.S. PATENT DOCUMENTS

| | | | |
|---|---|---|---|
| 4,463,043 A | * 7/1984 | Reeves et al. | 428/68 |
| 4,472,473 A | * 9/1984 | Davis et al. | |
| 4,734,146 A | 3/1988 | Halcomb et al. | |
| 4,910,067 A | * 3/1990 | O'Neill | 428/139 |
| 5,098,778 A | * 3/1992 | Minnick | 428/285 |
| 5,494,737 A | * 2/1996 | Sakai et al. | 428/317.9 |
| 5,791,118 A | * 8/1998 | Jordan | 52/783.11 |
| 5,954,898 A | 9/1999 | McKague et al. | |
| 5,968,641 A | * 10/1999 | Lewis | 428/298.1 |
| 5,969,301 A | * 10/1999 | Cullum, Jr. et al. | 181/286 |
| 6,106,944 A | * 8/2000 | Heikkila et al. | 428/397 |

FOREIGN PATENT DOCUMENTS

| | | |
|---|---|---|
| FR | 2614579 | 11/1988 |
| JP | 8174655 | 7/1996 |
| JP | 09011371 | 1/1997 |

* cited by examiner

Primary Examiner—Carl D. Friedman
Assistant Examiner—Jennifer I. Thissell
(74) Attorney, Agent, or Firm—Bracewell & Patterson, L.L.P.

(57) ABSTRACT

An uncured, thermoset resin sheet is reinforced with oriented fibers and is slit to define a desired length for the fibers. A series of the sheets are cut and stacked to form integrated layers of the composite material for a structural panel. The panel has two outer layers that sandwich two shorter layers on each end, and syntactic or foamed resin layer in between. Each of the composite layers is formed from the same materials and by the same process, but may vary in the directional orientation of their fibers. The uncured panel is assembled into a flexible, substantially flat configuration is heated and formed to the contours of a tool having a undulated surface geometry. The panel is further heated to cure the combined composite and syntactic resins into a series of undulations that permeate each of its layers. In one embodiment, the undulations are in a smooth, sine wave-like pattern that allow the panel to maintain a planar configuration. Although the fibers themselves do not stretch, the short lengths of the fibers enable stretching of the material in the fiber direction so that deformation of the composite is possible in all directions. The panel is stiffened both by spacing its outer layers apart with the syntactic layer, and by its undulated surface.

13 Claims, 3 Drawing Sheets

COMPOSITE STRUCTURAL PANEL WITH UNDULATED BODY

CROSS-REFERENCE TO RELATED APPLICATIONS

The following U.S. Patent Applications by the same inventor, Elbert L. McKague, Jr. are being simultaneously filed and incorporated herein by reference: U.S. Patent Application entitled "Apparatus And Method For Controlled Damage Of Conformable Materials" Ser. No. 09/645,223; U.S. Patent Application entitled "Apparatus And Method For Joining Dissimilar Materials To Form A Structural Support Member" U.S. Pat. No. 6,374,570; and by the same inventor together with the inventors Ronald P. Schmidt and David T. Uhl, U.S. Patent Application entitled "Composite Materials Support Structures With Sinusoidal Webs And Method Of Fabricating Same" Ser. No. 09/648,488.

BACKGROUND OF THE INVENTION

1. Technical Field

The present invention relates in general to an improved structural panel, and in particular to an improved structural panel with an undulated surface. Still more particularly, the present invention relates to an undulated structural panel concurrently formed from composite materials and syntactic or foamed resins.

2. Description of the Prior Art

In the prior art, structural panels are typically stiffened by attaching individual stiffening elements to the panels, such as hats, blades, "J's", or "C's". These additional elements increase the cost of fabricating the panels and are limited in adaptability. Although stiffened structural panels have also been achieved by incorporating honeycomb core or similar materials between two laminate faces having the appropriate planar or smoothly curved profile, concurrent stiffening by this latter method has limitations on panel shape and can be costly to practice with control.

Similarly, stiffening via a geometry of corrugations or beads has not been practical. Simple, low-cost fabrication of composite structures with beaded or corrugated stiffening elements has been difficult because inextensible fibers cause bridging or wrinkling. This problem is often present even when laid layer by layer to the contour of the forming tool. Consequently, the corrugations or beads of such a structure cannot be readily stiffened in a direction normal to the corrugations by incorporating a layer of syntactic or foamed resins to create a sandwich effect.

SUMMARY OF THE INVENTION

An uncured, thermoset resin sheet is reinforced with oriented fibers and is slit to define a desired length or lengths for the fibers. A series of the sheets is cut and stacked to form integrated layers of the composite material for a structural panel. The panel has two such outer layers that sandwich two shorter layers on each end, and a syntactic or foamed resin layer in between. The two shorter layers are required for the condition where it is desirable to isolate and protect the syntactic resin from direct exposure to humidity or for some other such purpose. In many cases, the shorter layers may be omitted, leaving the syntactic resin visible at the ends. Each of the composite layers is formed from the same materials and by the same process, but may vary in the directional orientation of their fibers.

The uncured panel is assembled into a flexible, substantially flat configuration and then is heated and formed to the contours of a tool having an undulated surface geometry. The panel is further heated to cure the combined composite and syntactic resins into a series of rigid undulations that permeate each of its layers. In one embodiment, the undulations are in a smooth, sine wavelike pattern that allow the panel to maintain a planar configuration. Although the fibers themselves do not stretch, the short lengths of the fibers enable stretching of the material in the fiber direction so that deformation of the composite is possible in all directions. The panel is stiffened in one direction by spacing its outer layers apart with the syntactic layer, and in an orthogonal direction by its undulated surface.

Accordingly, it is an object of the present invention to provide an improved structural panel.

It is an additional object of the present invention to provide an improved structural panel with an undulated surface.

Another object of the present invention is to provide an undulated structural panel that is formed in one operation from a flat or appropriately contoured composite laminate.

Still another object of the present invention is to provide an undulated structural panel concurrently formed from composite materials and syntactic or foamed resins.

The foregoing and other objects and advantages of the present invention will be apparent to those skilled in the art, in view of the following detailed description of the preferred embodiment of the present invention, taken in conjunction with the appended claims and the accompanying drawings.

DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
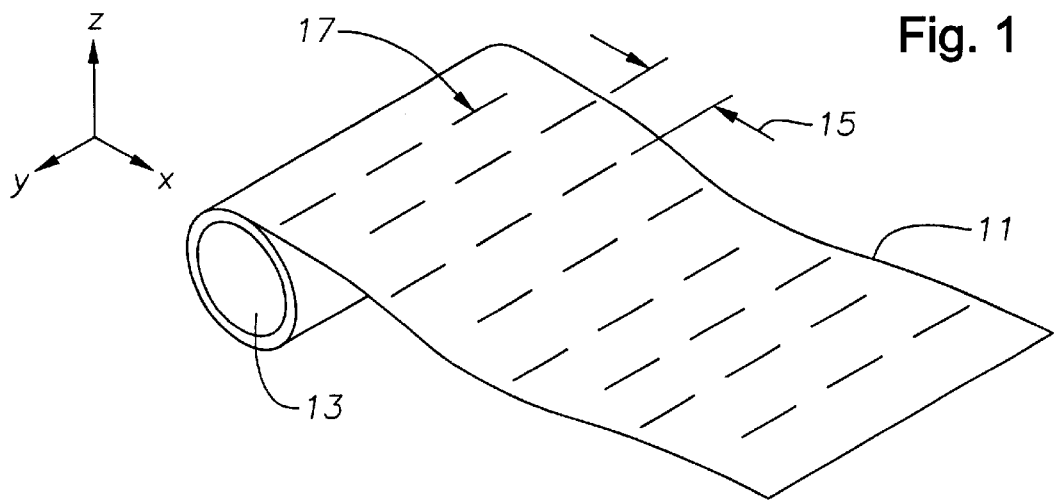
FIG. 1 is a schematic, isometric drawing of a roll of composite material.

Referring to FIG. 1, a sheet 11 of composite material is shown in the form of a roll 13. A Cartesian coordinate system is provided throughout the drawings for reference purposes. The composite material of sheet 11 is an uncured, thermoset resin that is reinforced with collimated fibers. In this disclosure, the term "collimated" is used to describe continuous, inextensible fibers that align in exactly the same direction. Typically, this solution produced long, discontinuous fibers that possessed individual fiber segmentation qualities as opposed to bundle segmentation qualities. The fibers are oriented in a specific direction on each sheet 11 and may have a uniform length or a variable length, depending upon the application. In the embodiment shown, the fiber lengths 15 are defined by slits 17 formed in the sheet 11 of composite material. The slits 17 may extend in a direction that is substantially transverse (perpendicular) to or at an acute angle relative to the fibers.

Figure 2:
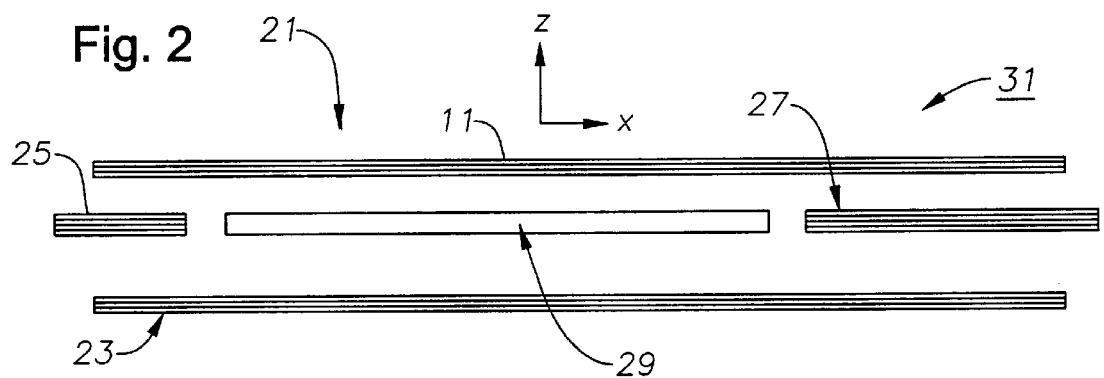
FIG. 2 is an exploded side view of several laminates of the composite material of FIG. 1 shown prior to assembly.

As shown in FIG. 2, a plurality of sheets 11 may be cut and stacked to form a single, integrated layer 21. Layer 21 will ultimately be assembled to form the top outer layer of a panel 31 (shown exploded). Panel 31 also has a bottom layer 23 that is equivalent to top layer 21, and two shorter, inner end layers 25, 27. Inner end layers 25, 27 protrude beyond the longitudinal ends of top and bottom layers 21, 23 in the x-direction. Each layer 23, 25, 27 is from the same materials and by the same process as top layer 21, but may vary in the number of sheets 11 used to form them, as well as the directional orientation of the fibers used therein. The core of panel 31 is an inner layer 29 that is shorter than top and bottom layers 21, 23. In the preferred embodiment, inner layer 29 is an uncured syntactic or foamed resin material of appropriate thickness, chemistry, and platform.

Figure 3:
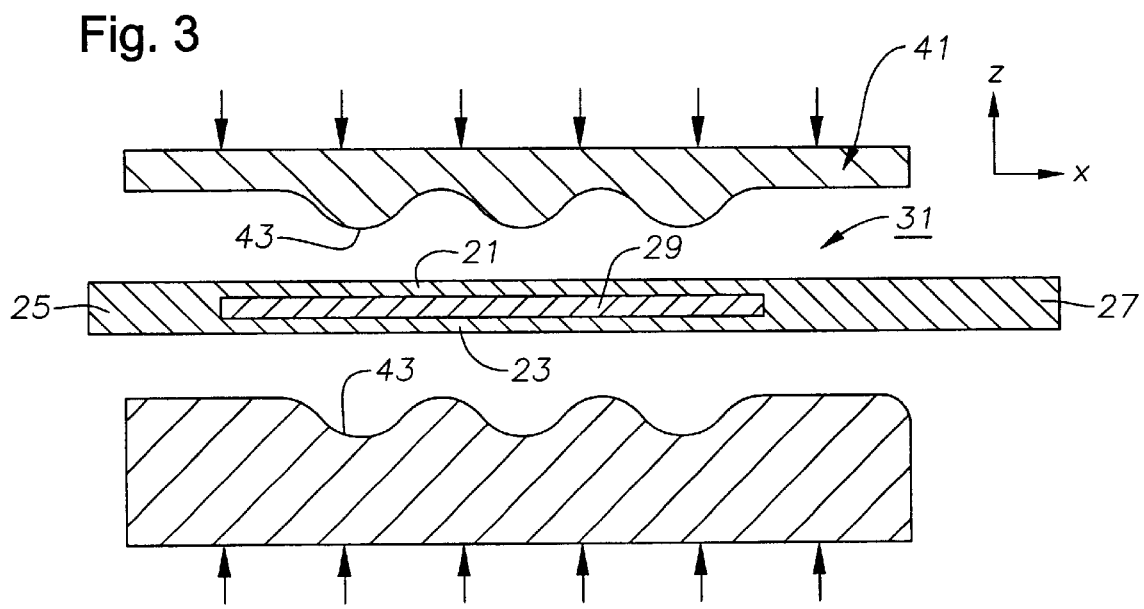
FIG. 3 is a side view of the laminates of FIG. 2 shown after assembly and prior to forming.
Figure 4:
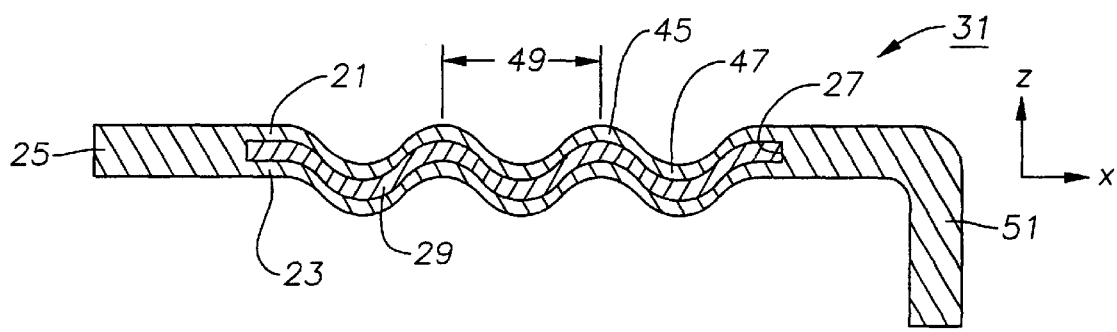
FIG. 4 is a side view of the laminates of FIG. 2 shown after formation into a panel.

Referring now to FIG. 3, the panel 31 is assembled into a flexible, substantially flat configuration such that inner layer 29 is sandwiched between layers 21, 23, 25, 27. The resulting uncured panel 31 is then heated and formed by an appropriate process (see arrows) to the contours of a tool 41 having a surface geometry characterized by a series of corrugations, beads, or undulations 43. Panel 31 may be further heated to cure the combined composite and syntactic resins (FIG. 4). The cured panel 31 has a series of uniform undulations forming peaks 45 and valleys 47 that permeate each layer therein. Undulations 45 alternate in the z-direction, extend substantially across panel 31 in the y-direction, and are generally transverse to the x-direction. When viewed in the y-direction, undulations 45 are in a smooth, sine wavelike pattern that allow panel 31 to generally maintain a planar configuration.

The lengths 15 of the fibers (FIG. 1) in the composite material are selected to be shorter than a period 49 defined between two adjacent peaks 45. Although the fibers themselves do not stretch, the selected or variable length fibers in the composite layers enable stretching of the material in the fiber direction so that deformation of the composite is possible in all directions. Thus, segmenting the fibers enables cure-form processing and allows the material to take the complex shape of the tool 41 without bridging or wrinkling. Spacing the faces or outer layers 21, 23 apart with layer 29 imparts an inherent stiffness to the resulting panel 31. Forming panel 31 on tool 41 to create undulations imparts an additional component of stiffness to the resulting structure due to the out-of-plane geometry.

If desired, selected areas such as the substantially orthogonal panel edge 51 (FIG. 4) may have additional strips of fiber-reinforced material (end layer 27) interleaved with top and bottom layers 21, 23, rather than with the syntactic or foamed resin material of layer 29. This configuration creates stronger elements in panel 31 that are better suited for attachment purposes and the like. The out-of-plane flange 51 is created during the forming step as the platform of panel 31 extends beyond the edges of tool 41. Tool 41 has an appropriate thickness to provide a land against which the created flange 51 may be pressed.

Figure 5:
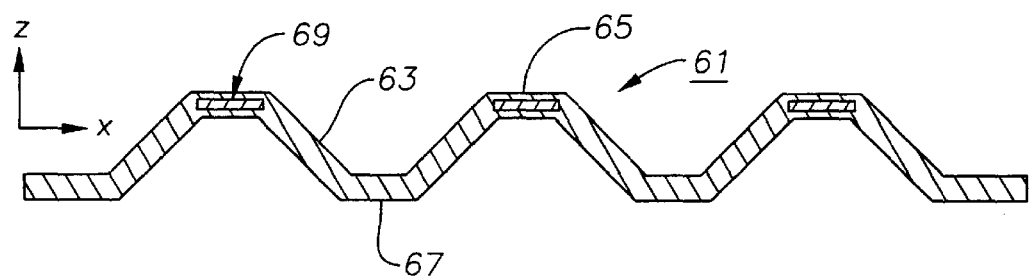
FIG. 5 is a side view of a second embodiment of the panel of FIG. 4.
Figure 6:
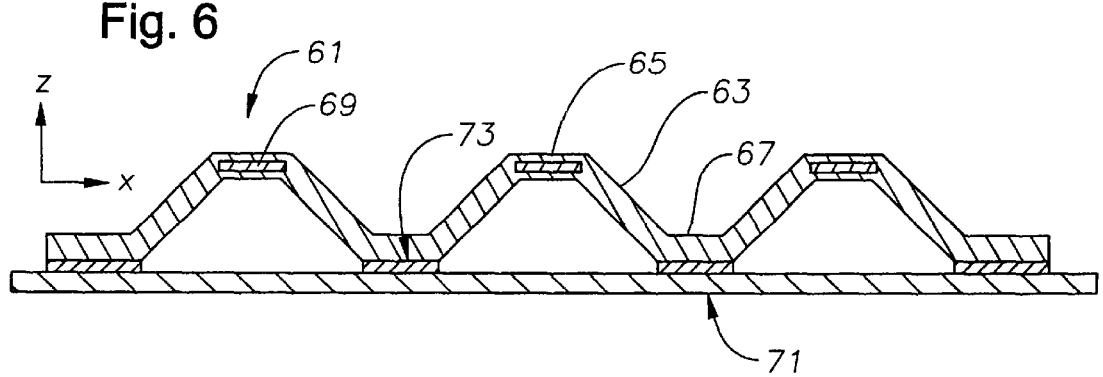
FIG. 6 is a side view of the panel of FIG. 5 shown bonded to a surface.

Alternatively, a corrugated or bead-stiffened panel 61 (FIG. 5) may be formed without flanges. Panel 61 has inclined portions 63 with flat peaks 65 and valleys 67 formed at the top and bottom of each bead. Peaks 65 and valleys 67 are substantially parallel to the generally configuration of panel 61. In this embodiment, only peaks 65 are reinforced with short flat segments of syntactic or foamed resin material 69. The inclined portions 63 and valleys 67 are not so reinforced but are homogeneous instead. After panel 61 is cured, valleys 67 may be bonded to a laminate 71 of the same planar profile with adhesive 73 (FIG. 6). In this manner, panel 61 provides stiffness when one surface of the resulting structure must be flat or smoothly contoured as might be required for an aircraft aerodynamic surface.

Figure 7:
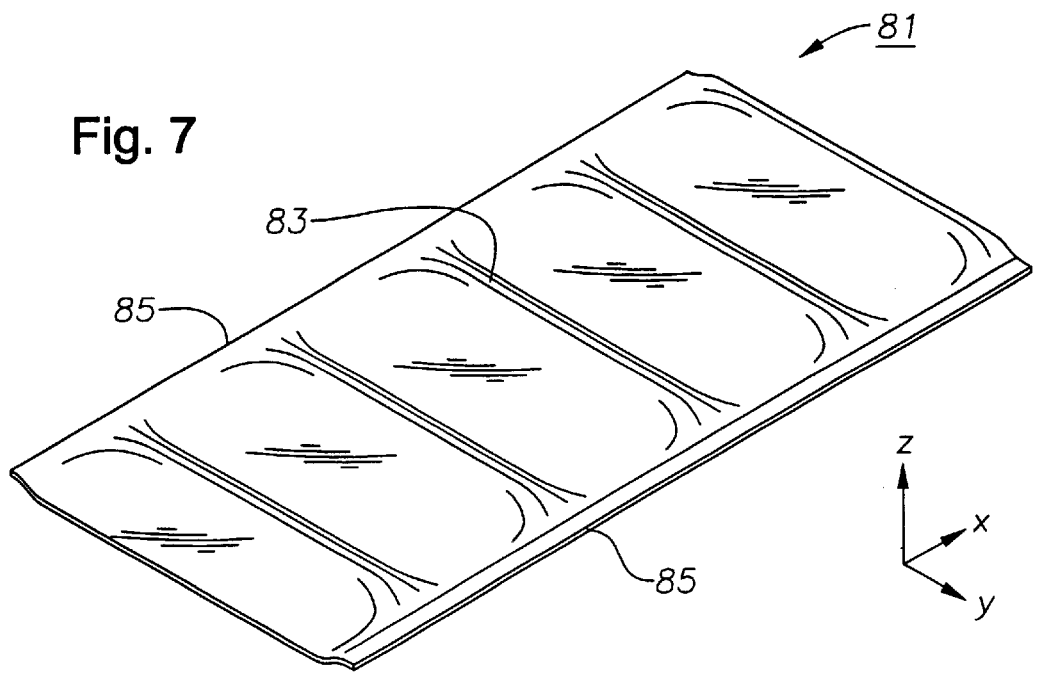
FIG. 7 is an isometric view of a third embodiment of the panel of FIG. 4.
Figure 8:
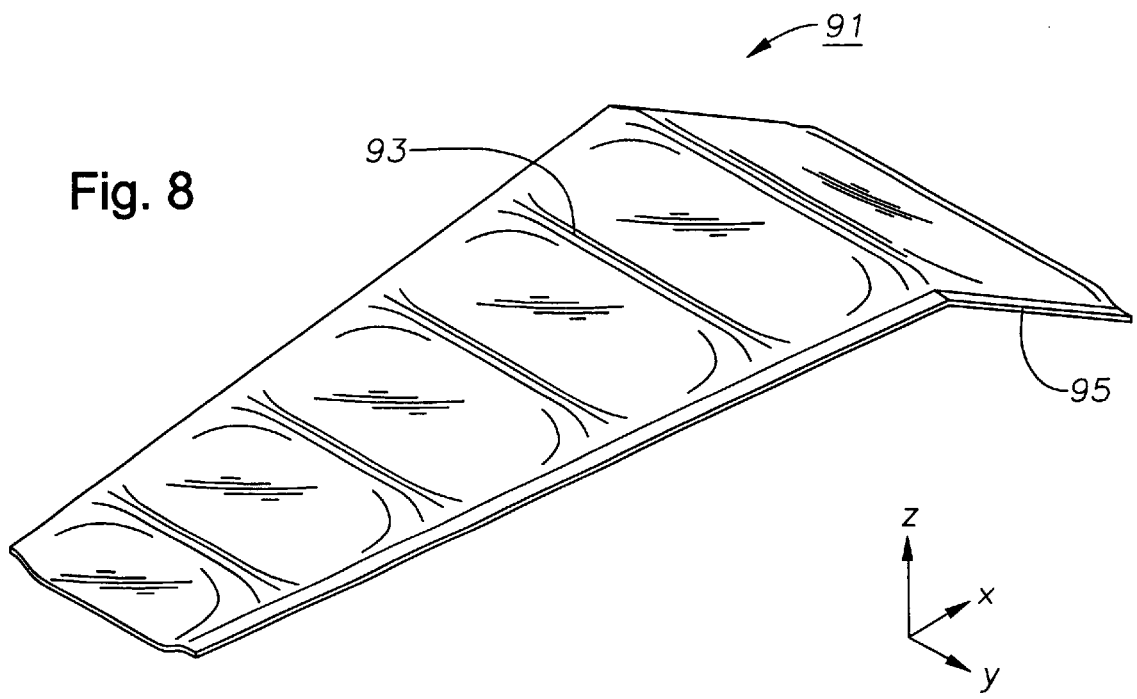
FIG. 8 is an isometric view of a fourth embodiment of the panel of FIG. 4.

Another embodiment of the invention is depicted in FIG. 7 as panel 81. Panel 81 has undulations or beads 83 that are similar to undulations 45 in panel 31, except that beads 83 terminate in the y-direction before reaching the y-side edges of panel 81. In other words, panel 81 has generally flat side edges 85 extending in the x-direction along each of its lateral y-sides. In yet another embodiment of the invention, FIG. 8 depicts a panel 91 having a y-dimension that is tapered in the x-direction such that the left side end is smaller than the right side end. In this version, the beads 93 formed in panel 91 also decrease in their y-dimension from right to left. Panel 91 is also shown with an out-of-plane flange 95 on its right side end.

The invention has several advantages as it provides a low-cost, high stiffness-to-weight structure for integration with other structural elements to create a more complex structure, such as a fighter aircraft fuselage, and where neither surface of the panel needs to be planar or smoothly curved. The selected or variable length fibers in the composite layers enable stretching of the material in the fiber direction so that deformation of the composite is possible in all directions. The segmented fibers enable Cure-Form Processing and allow the material to take on complex shapes without bridging or wrinkling. Spacing the outer layers apart with the syntactic layer imparts an inherent stiffness to the resulting panel. Forming undulations in the panel imparts additional component stiffness to the resulting structure due to the out-of-plane geometry. The combination of these two means of stiffening provides a greater panel stiffness to weight than other available means. Moreover, the structure can be fabricated at a lower cost than structures stiffened by other means.

While the invention has been shown or described in only some of its forms, it should be apparent to those skilled in the art that it is not so limited, but is susceptible to various changes without departing from the scope of the invention. For example, a beaded or corrugated panel, either flanged or unflanged with flats at the tops of the beads or corrugations, can be manufactured using the composite material without incorporating the syntactic or foamed resin layer. In addition, incorporation or some other material such as unidirectional bundles or rods or reinforcing fibers can be employed instead of the syntactic or foamed resin layer.

What is claimed is:

1. A structural panel, comprising:
   a pair of outer layers, each formed from a laminate of composite material sheets of fiber-reinforced, thermoset resin;
   an inner layer located between the outer layers such that the panel has a generally planar configuration that defines a coordinate system with x, y, and z-directions;

a series of undulations formed in each layer of the panel substantially across the y-direction of the panel and generally transverse to the x-direction of the panel, the undulations alternating in the z-direction for stiffening the panel;

wherein the fibers in the composite material sheets have lengths that are less than a length of a period of the undulations; and wherein a y-dimension of the panel is tapered in the x-direction.

2. A structural panel, comprising:

a pair of outer layers, each formed from a laminate of composite material sheets of fiber-reinforced, thermoset resin;

an inner layer located between the outer layers such that the panel has a generally planar configuration that defines a coordinate system with x, y, and z-directions;

a series of undulations formed in each layer of the panel substantially across the y-direction of the panel and generally transverse to the x-direction of the panel, the undulations alternating in the z-direction for stiffening the panel;

wherein the fibers in the composite material sheets have lengths that are less than a length of a period of the undulations; and wherein each of the composite material sheets of the laminate have slits in the fibers.

3. A structural panel, comprising:

a pair of outer layers, each formed from a laminate of composite material sheets of fiber-reinforced, thermoset resin;

an inner layer located between the outer layers such that the panel has a generally planar configuration that defines a coordinate system with x, y, and z-directions;

a series of undulations formed in each layer of the panel substantially across the y-direction of the panel and generally transverse to the x-direction of the panel, the undulations alternating in the z-direction for stiffening the panel;

wherein the fibers in the composite material sheets have lengths that are less than a length of a period of the undulations; and wherein the fibers are collimated.

4. A structural panel, comprising:

a pair of outer layers, each formed from a laminate of composite material sheets of fiber-reinforced, thermoset resin;

an inner layer located between the outer layers such that the panel has a generally planar configuration that defines a coordinate system with x, y, and z-directions;

a series of undulations formed in each layer of the panel substantially across the y-direction of the panel and generally transverse to the x-direction of the panel, the undulations alternating in the z-direction for stiffening the panel;

wherein the fibers in the composite material sheets have lengths that are less than a length of a period of the undulations;

wherein the undulations comprise inclined portions with a series of generally planar peaks and valleys that are substantially parallel to the generally planar configuration of the panel; and wherein the inclined portions are formed of homogenous materials.

5. A structural panel, comprising:

a pair of outer layers having a generally planar configuration that defines a coordinate system with x, y, and z-directions, each of the outer layers being formed from a laminate of composite material sheets of fiber-reinforced, thermoset resin and having a longitudinal x-dimension, wherein each of the composite material sheets of the laminate have slits in the fibers, and the fibers in each layer of the laminate are oriented in a layer-specific direction;

an inner layer selected from a group consisting of syntactic and foamed resin material, the inner layer being located between the outer layers and having an x-dimension with longitudinal ends that is shorter than the x-dimension of the outer layers;

a series of uniform undulations formed in each layer of the panel substantially across the y-direction of the panel and generally transverse to the x-direction of the panel, the undulations alternating in the z-direction for stiffening the panel; and wherein the fibers in the composite material sheets have lengths that are less than a length of a period of the undulations.

6. The structural panel of claim 5, further comprising an additional laminate of composite material sheets located between the outer layers and adjacent to each of the longitudinal ends of the inner layer.

7. The structural panel of claim 5, further comprising a flange formed along an edge of the panel, the flange extending generally out of plane relative to the panel.

8. The structural panel of claim 5 wherein the undulations form a sine wave pattern.

9. The structural panel of claim 5 wherein the undulations are beads having y-dimensions that are less than a y-dimension of the panel to define generally flat side edges on the panel.

10. The structural panel of claim 5 wherein a y-dimension of the panel is tapered in the x-direction.

11. The structural panel of claim 5 wherein the fibers are collimated.

12. The structural panel of claim 5 wherein the undulations comprise inclined portions with a series of generally planar peaks and valleys that are substantially parallel to the generally planar configuration of the panel.

13. The structural panel of claim 12 wherein the inclined portions are formed of homogenous materials.

* * * * *